US008701087B2

(12) United States Patent  (10) Patent No.: US 8,701,087 B2
Paulheim et al.  (45) Date of Patent: Apr. 15, 2014

(54) SYSTEM AND METHOD OF ANNOTATING CLASS MODELS

(75) Inventors: Heiko Paulheim, Reinheim (DE); Florian Probst, Darmstadt (DE)

(73) Assignee: SAP AG, Walldorf (DE)

( * ) Notice: Subject to any disclaimer, the term of this patent is extended or adjusted under 35 U.S.C. 154(b) by 461 days.

(21) Appl. No.: 12/912,008

(22) Filed: Oct. 26, 2010

(65) Prior Publication Data

US 2012/0102456 A1  Apr. 26, 2012

(51) Int. Cl.
*G06F 9/44* (2006.01)

(52) U.S. Cl.
USPC ........................................................ 717/116

(58) Field of Classification Search
USPC ........................................................ 717/116
See application file for complete search history.

(56) References Cited

U.S. PATENT DOCUMENTS

2004/0015840 A1*  1/2004  Walker .......................... 717/108
2006/0143594 A1*  6/2006  Grimaldi ....................... 717/123
2010/0083212 A1*  4/2010  Fritzsche et al. .............. 717/104

OTHER PUBLICATIONS

BabelFish, "Serialising Java Objects to RDF with Jersey", Sep. 24, 2008, Oracle, pp. 1-10.*
Horrocks, "SWRL: A Semantic Web Rule Language Combining OWL and RuleML", May 21, 2004, W3C, pp. 1-28.*
Mike Uschold and Michael Gruninger, "Ontologies: Principles, Methods and Applications." Knowledge Engineering Review, vol. 11, No. 2, Jun. 1996.
Mike Uschold and Robert Jasper, "A Framework for Understanding and Classifying Ontology Applications." In Proceedings of the IJCAI-99 Workshop on Ontologies and Problem-Solving Methods (KRR5), Aug. 2, 1999.
Thomas R. Gruber, "A Translation Approach to Portable Ontologies Specifications." Knowledge Acquisition, 5(2): 199-220, Apr. 1993.
Peter Spyns, Robert Meersman and Mustafa Jarrar, "Data Modelling Versus Ontology Engineering." SIGMOD Rec. 31(4). 12-17. 2002.
Colin Atkinson, Matthias Gutheil and Kilian Kiko, "On the Relationship of Ontologies and Models." In Brockmans, S., Jung, J., Sure, Y., eds.: WoMM. vol. 96 of LNI., GI, 47-60. 2006.
Francisco Ruiz and Jose R. Hilera, Using Ontologies in Software engineering and Technology. In Ontologies for Software Engineering and Software Technology, Chapter 2. Oct. 2006.
Uwe Assmann, Steffen Zschaler, and Gerd Wagner, "Ontologies, Meta-Models, and the Model-Driven Paradigm." Ontologies for Software Engineering and Technology. Chapter 9, Oct. 2006.
Colin Puleston, Bijan Parsia, James Cunningham, and Alan Rector, "Integrating Object-Oriented and Ontological Representations: A Case Study in Java and OWL." In Sheth, A.P., Staab, S., Dean M., Paolucci, M., Maynard, D., Finin, T.W., Thirunarayan, K., eds.: International Semantic Web Conference. vol. 5318 of lecture Notes in Computer Science, Springer. 2008.

(Continued)

*Primary Examiner* — Li B Zhen
*Assistant Examiner* — Duy Khuong Nguyen
(74) *Attorney, Agent, or Firm* — Fountainhead Law Group PC

(57) ABSTRACT

In one embodiment the present invention includes a computer-implemented method of annotating software objects. The method includes storing rules that define how to annotate a software object. The method further includes processing the software object according to the rules. The method further includes generating an annotation document based on the software object having been processed according to the rules. The method further includes generating an annotated software object based on the software object and the annotation document. As a result, annotated software objects may be generated in a dynamic, non-intrusive manner.

14 Claims, 7 Drawing Sheets

(56) References Cited

OTHER PUBLICATIONS

Jeremyj. Carroll, Ian Dickinson, Chris Dollin, Dave Reynolds, Andy Seaborne, Kevin Wilkinson, "Jena: Implementing the Semantic Web Recommendations." In Feldman, S.I., Uretsky, J., Najork, J., Wills, C.E., eds.: Proceedings of the 13th International Conference on World Wide Web-Alternate Track Papers & Posters, ACM (74-83). 2004.

Sean Bechhofer, Raphael Volz, and Phillip Lord, "Cooking the Semantic Web with the OWL API." No. 2870 in LNCS, Springer, 659,675. 2003.

Grigori Babitski, Florian Probst, Joerge Hoffmann, and Daniel Oberle, "Ontology Design for Information Integration in Disaster Management." In Proceedings of the 4th International Workshop on Applications of Semantic Technologies (AST '09. 2009.

Max Voelkel and York Sure, "RDFReactor—From Ontologies to Programmatic Data Access." In Posters and Demos at International Web Conference (ISWC). 2005.

A. Kalyanpur, D. Jimenez Pastor, S. Battle, and J. Padget, "Automatic Mapping of OWL Ontologies into Java." Proceedings of the Sixteenth International Conference on Software Engineering & Knowledge Engineering (SEKE '2004), 98-103. Jun. 20-24, 2004.

Andreas Eberhart, "Automatic Generation of Java/SQL Based Inference Engines from RDF Schema and RuleML." In the Semantic Web—ISWC 2002, First International Semantic Web Conference, Sardinia, Italy, Jun. 9, 12, 2002, Proceeding. vol. 2342 of Lecture Notes in Computer Science., 102-116. Springer 2002.

F. Silva Parreiras, C. Saathoff, T. Walter, T. Franz, and S. Staab, "APIs a gogo: Automatic Generation of Ontology APIs." In Proceedings of the International Conference on Semantic Computing, Los Alamitos, CA, IEEE Computer Society. 342-348. 2009.

E. Oren, R. Delbru, S. Gerke, A. Haller, S. Decker, "ActiveRDF: Object-Oriented Semantic Web Programming." International World Wide Web Conference Comittee (IW3C2). 817-824. May 8-12, 2007.

Aaron Swartz, "TRAMP: Makes RDF Look Like Python Data Structures." http://www.aaronsw.com/2002/tramp/.2002.

Matthias Quasthoff, Christoph Meinel, "Design Pattern for Object Triple Mapping." 2009 IEEE International Conference on Services Computing (SCC 2009) Sep. 21-25, 2009, 443-450. IEEE Computer Society 2009.

M. Fowler, Patterns of Enterprise Application Architecture. Chap. 3. Addison Wesley, Chapters 3 and 11-13. 2003.

Microsystems, S.: Annotations. http://java.sun.com/j2se/1.5.0/docs/guide/language/annoations.html. 2004.

H. Story: Sommer—Semantic Ojbect (Medata) Mapper. https://sommer.dev.java.net/ 2010.

Stephen L. Reed, "Semantic Annotation for Persistence." In Proceedings of AAAI2007's Workshop on Semantic e-Science. 2007.

A. Alishevskikh: RDFBeans (2009). http://rdfbeans.sourceforge.net/.

Jozef Wagner, Frantisek Babic and Peter Bednar, "Java RDF Framework for Knowledge Repository." IEEE, 99-102, Jan. 2009.

OpenRDF: ELMO. http://www.openrdf.org/doc/elmo/1.5/ (2009).

Guillaume Hillairet, Frederic Bertrand, Jean Yves Lafaye, "Bridging EMF Applications and RDF Data Sources." 2008.

Eclipse Modeling Framework (EMF). http://eclipse.org/modeling/emf/. 2008.

Nicola Guarino and Christopher A. Welty, "An Overview of OntoClean." International Handbooks on Information Systems. 2nd ed. Springer. 201-220. 2009.

W3C: XML Path Language (XPath) 2.0. http://www.w3.org/TR/xpath20/. Jan. 2007.

B. Agnew, Java Object Querying Using JXPath. http://www.w3.org/TR xpath20/. 2006.

International Standardization (ISO), I.O.: ISO/IEC 14977: Information Technology—Syntactic Metalanguage—Extended BNF. http://www.iso.org/iso/iso_catalogue/catalogue_tc/catalogue_detail.htm?csnumber=26153. 1996.

"Regular Expressions." http://www.opengroup.org/onlinepubs/007908799/xbd/re.html. 1997.

Michael Ley, "DBLP—Some Lessons Learned." Proceedings of the Very Large Data Bases (VLDB) Endowment. vol. 2, 1493-1500. Aug. 24-28, 2009.

E. Gamma, R. Helm, R.E. Johnson, and J. Vlissides, "Design Patterns: Elements of Reusable Object-Oriented Software." Chapter 4, Subchapter on Facade:, pp. 185-194. 1995.

Heiko Paulheim, "Efficient Semantic Event Processing: Lessons Learned in User Interface Integration." vol. 6089 of LNCS., Springer. 60-74. 2010.

Gerwert Stevens "Automatic Semantic Role Labeling in a Dutch Corpus." Master Thesis, Chapter 4.4, pp. 41-45. Sep. 2006.

* cited by examiner

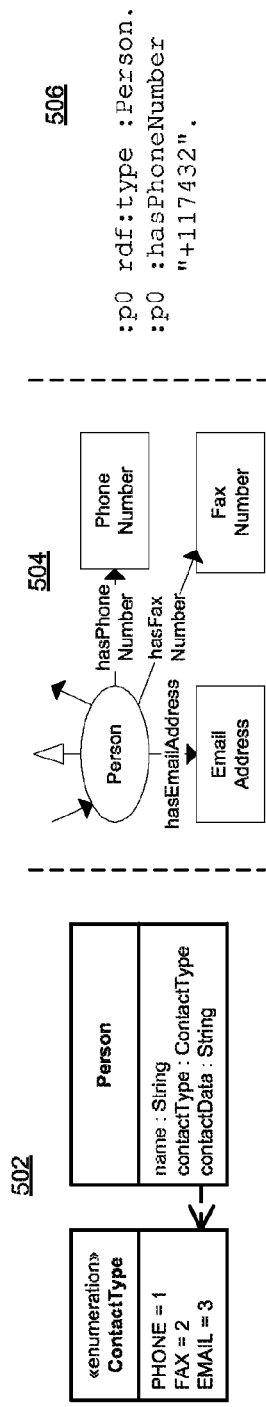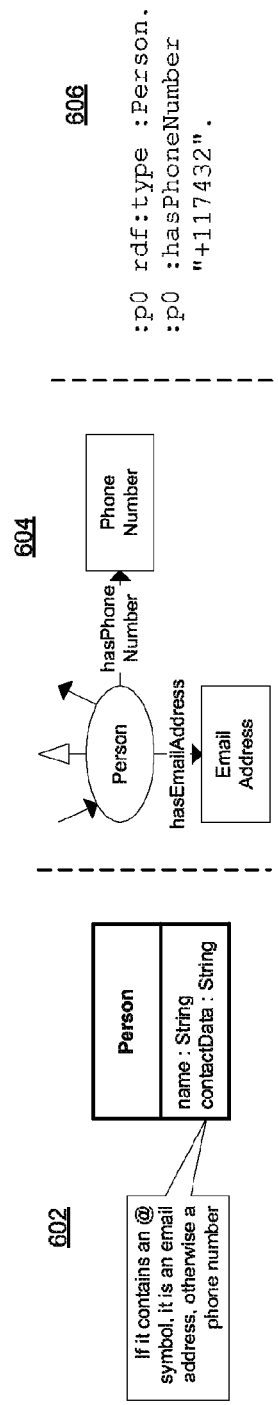
FIG. 5
FIG. 6

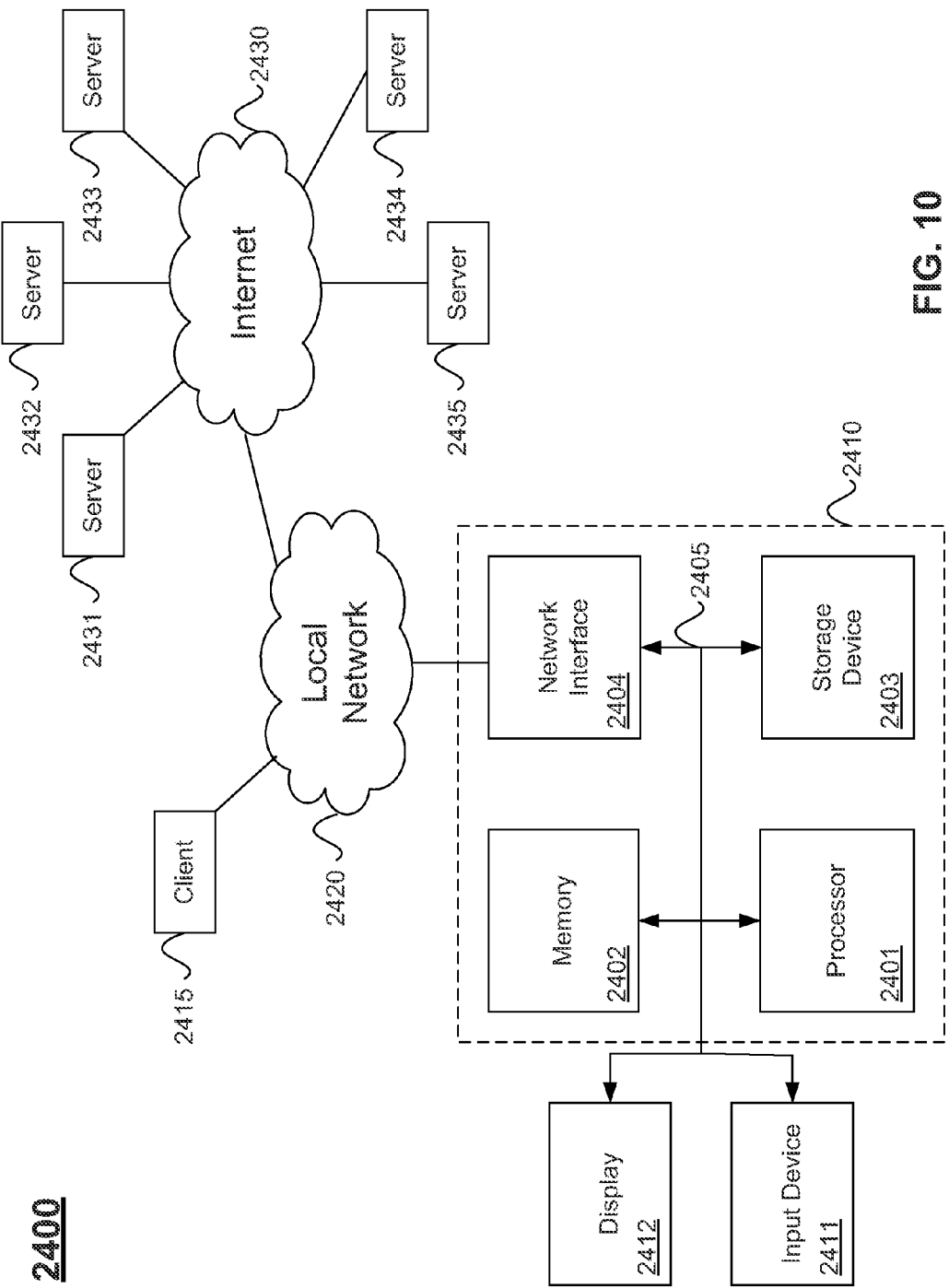

SYSTEM AND METHOD OF ANNOTATING CLASS MODELS

CROSS REFERENCE TO RELATED APPLICATIONS

Not Applicable

BACKGROUND

The present invention relates to object-oriented programming, and in particular, to dynamic semantic annotation of objects.

Unless otherwise indicated herein, the approaches described in this section are not prior art to the claims in this application and are not admitted to be prior art by inclusion in this section.

One of the central requirements of system integration is the unambiguous exchange of information, e.g. data objects in object oriented programming. A common way of establishing such an exchange is using semantic annotations of the objects exchanged. Current systems use extensible markup language (XML), or the resource description framework (RDF) combined with the web ontology language (OWL) for integration. While the former does not provide any information about the exchanged objects' semantics, the latter can only be applied if there exists a 1:1 mapping between a class model and an ontology.

More specifically, system integration is a common software engineering task. Ontologies have been proposed for a long time as a means for providing interoperability between systems, as they can serve as an "inter-lingua" and an "interchange format" for information exchange. Practically, this means that exchanged information is annotated with a commonly agreed upon ontology. That is, based on annotations of the systems' class models using a commonly agreed upon ontology (referred to as the T-Box), object instances of those class models can be expressed as exchanged information (referred to as A-box instances) of that ontology, and be transmitted between systems in a semantically unambiguous way.

Since the paradigm of object oriented programming is predominant, information exchange is implemented as an exchange of data objects in most cases. Thus, using semantic annotations for information exchange boils down to annotating data objects.

Annotating objects means providing universally understandable information about the object, e.g. a set of RDF statements, referring to a commonly agreed upon ontology. There are a variety of approaches for producing such annotations, which in most cases statically assign each class in the class model to a corresponding category in the ontology, thus tacitly assuming that a 1:1 mapping between the class model and the ontology exists. Furthermore, those approaches are most often implemented in an intrusive manner, i.e. the class model's implementation needs to be adapted for adding semantic annotations. Three general types of approaches are generative approaches, intrusive approaches and non-intrusive approaches.

In generative approaches, the class model is generated from the ontology with which the objects shall be annotated. Thus, the degree of influence is very high. Generative approaches have a 1:1 mapping between the class model and the ontology.

Generative approaches are an appealing solution when building software from scratch. Once a domain ontology has been captured together with domain experts, e.g. as a part of the specification, it can be used to automatically generate part of the program code (creating an ontology from program code is also possible, although only rarely seen). Besides the savings in development efforts, generative approaches ensure by definition that the ontology and the class model always match perfectly, i.e. a 1:1 mapping between the class model and the ontology exists, and that the ontology and the software do not run out of sync when the ontology is evolving over time (given that the class model is regenerated after each change in the ontology).

Examples for generative approaches are the approach described by Voelkel and Sure in "RDFReactor—From Ontologies to Programmatic Data Access", the approach described by Kalyanpur, Pastor, Battle and Padget in "Automatic Mapping of OWL Ontologies into Java", the approach described by Eberhart in "Automatic Generation of Java/SQL Based Ingerence Engines from RDF Schema and RuleML", and the approach described by Parreiras, Saatho, Walter, Franz and Staab in "APIs à gogo: Automatic Generation of Ontology APIs". Other examples include the approach described by Oren, Delbru, Gerke, Haller and Decker in "ActiveRDF: Object-Oriented Semantic Web Programming" as applied to Ruby, and the approach described by Swartz in "TRAMP: Makes RDF look like Python Data Structures" as applied to Python.

Intrusive approaches perform changes on the class model's implementation, such as adding special attributes and/or methods to the classes for providing annotations. Intrusive approaches may adapt the class model's implementation for adding semantic annotations.

Intrusive approaches do not generate new Java classes from an ontology, but modify (i.e. intrude into) an existing class model by adding additional code fragments. Examples of intrusive approaches include the approach described by Story in "Sommer—Semantic Object (Metadata) Mapper", the approach described by Reed in "Semantic Annotation for Persistence", the approach described by Alishevskikh in "RDFBeans", the approach described by Wagner, Babi and Bednar in "Java RDF Framework for Knowledge Repository", and the approach described by Quasthoff and Meinel in "Design Pattern for Object Triple Mapping". Most of those works are based on the foundation of mapping class models and databases described by Fowler in "Patterns of Enterprise Application Architecture". Note that all those approaches require a 1:1 mapping between Java classes and concepts in the ontology.

Non-intrusive approaches provide ways to annotate class models without modifying those class models, e.g. by using mappings in a separate file, or by dynamically registering classes with categories in the ontology at run-time. A drawback of non-intrusive approaches is often a larger coding effort (as compared to running a code generator or adding a few Java annotations). Examples of non-intrusive approaches include the ELMO approach described at <www.openrdf.org/doc/elmo/1.5/>, and the approach described by Hillairet, Bertrand and Lafaye in "Bridging EMF applications and RDF data sources".

SUMMARY

Most of the current approaches for semantic annotation of data objects suffer from two main defects: (a) they only support static 1:1 mappings between class models and ontologies, and (b) they are intrusive, i.e. require changes to the class model for performing the annotation.

More specifically, generative approaches may only be used when creating new software. In case of existing code for the class model, they cannot be applied. Therefore, they are not suitable for integration tasks dealing with legacy code.

Similarly, intrusive approaches are suitable if a class model already exists, or may be used when creating the class model from scratch; e.g. in projects where the use of ontologies has not been foreseen from the beginning of the development, they demand more discipline from the developers, as they have to take care about the synchronicity of the class model and the ontology themselves.

These defects occur due to the different natures of class models and ontologies. Class models serve the purpose of creating a model which allows for efficient programming, and results in efficiently executable code. In contrast, ontologies serve the purpose of providing a clear, formal conceptualization of a domain. 1:1 mappings would result in either cumbersome class models or in ontologies reflecting the shared conceptualization in a suboptimal manner. Hence the assumption of an exact 1:1 mapping (see (a) above) is an assumption which is not realistic.

Furthermore, system integration most often deals with legacy systems that cannot or must not be altered, be it for technical or legal reasons. These findings make it hard to apply current, intrusive annotation approaches (see (b) above) to real-world integration tasks.

An embodiment of the present invention implements a rule-based approach for semantically annotating class models dynamically, which can be implemented in a non-intrusive way. This approach allows using pragmatic class models and comprehensive formal ontologies in parallel, and thereby helps bridging the two worlds. In general, an embodiment of the present invention uses rules based on XPath expressions for dynamic semantic annotation and allows using existing software systems in a non-intrusive manner. Other embodiments may use a different syntax or language than XPath expressions for defining such rules.

In one embodiment the present invention includes a computer-implemented method of annotating software objects. A software object is provided. The software object is an instance of a class in an object-oriented computing environment. The software object may be generated by a software component that is executed by an application server. The method includes storing rules that define how to annotate the software object and that operate according to the class of the software object. The method further includes processing the software object according to the rules. An annotation engine component that is executed by the application server may process the software object according to the rules. The method further includes generating an annotation document based on the software object having been processed according to the rules. The annotation engine component may generate the annotation document. The method further includes generating an annotated software object based on the software object and the annotation document. The annotated software object corresponds to the software object as annotated by the annotation document. An application programming interface component that is executed by the application server may generate the annotated software object.

The method may be implemented by a computer program that is executed by a computer system. Alternatively, a computer system may be configured to implement the method.

According to an embodiment, the annotation engine component is configured to process the software object in a non-intrusive manner with regard to the software component.

According to an embodiment, the rules relate an ontology and a class model according to an arbitrary mapping. For example, the employed rules and ontology comply to a consistent formal theory, making up the basis for semantically annotating classes in a class model.

According to an embodiment, the rules define how to create an annotation document, the rules include categories and relations, and the categories and relations relate to a domain ontology.

According to an embodiment, the annotation engine component is configured to generate the annotation document in a dynamic manner.

An embodiment of the present invention may have one or more of the following features. First, it works in cases where 1:1 mappings between class models and ontologies do not exist (e.g., it operates according to an arbitrary mapping). Second, it is non-intrusive, thus the underlying class model does not need to be changed. Third, it is usable when dealing with software components that cannot be themselves altered to generate annotations.

The following detailed description and accompanying drawings provide a better understanding of the nature and advantages of the present invention.

BRIEF DESCRIPTION OF THE DRAWINGS

FIGS. 3-9 are diagrams that show various examples using a class model, an ontology, and a set of RDF triples.

FIG. 10 is a block diagram of an example computer system and network for implementing various embodiments.

DETAILED DESCRIPTION

Figure 1:
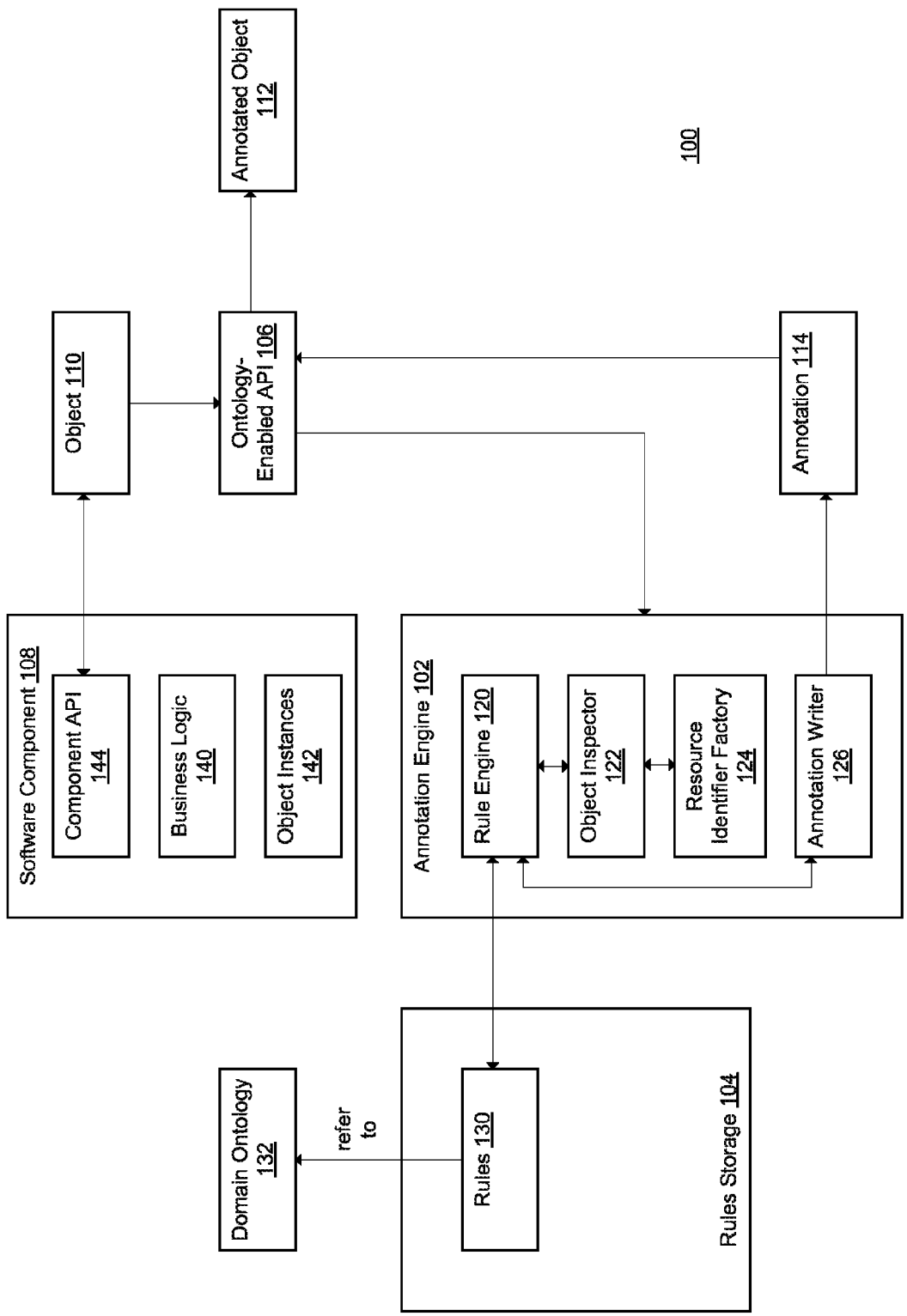
FIG. 1 is a block diagram of a system that implements annotations according to an embodiment.

Described herein are techniques for generating semantic annotations for objects. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In this document, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

An embodiment of the present invention is implemented in an object-oriented programming environment. In the following description, the term "object-oriented programming" is to be understood to refer not to a generic type of programming; but instead to a specific type of programming. In general, object-oriented programming is a programming paradigm that uses objects to design applications and computer programs. An object-oriented program may thus be viewed as a collection of interacting objects, as opposed to a non-object-oriented programming model, in which a program is seen as a list of tasks (subroutines) to perform. In general, the teachings of the present invention are applicable to structured compound data types, such as RECORD in Pascal or STRUCT in C/C++, both of which may also be used in non object-oriented programming environments.

An embodiment of the present invention uses objects. In the following description, the term "object" is to be understood to refer not to a generic data file that is an input to, an output of, or used by, a computer program; but instead to a specific type of data structure in an object-oriented programming environment. In general, an object is a data structure consisting of data fields and methods together with their interactions. An object is a discrete bundle of functions and procedures, often relating to a particular real-world concept. Other pieces of software can access the object only by calling its functions and procedures that have been allowed to be called by outsiders. Each object is capable of receiving messages, processing data, and sending messages to other objects. Each object can be viewed as an independent "machine" with a distinct role or responsibility. The actions (or "methods") on these objects are closely associated with the object. For example, the data structures tend to "carry their own operators around with them" (or at least "inherit" them from a similar object or class). (This inheritance may be contrasted with a non-object-oriented programming model, in which the data and operations on the data do not have a tight, formal association.)

An embodiment of the present invention uses classes. In the following description, the term "class" is to be understood to refer not to a generic data file that is an input to, an output of, or used by, a computer program; but instead to a specific type of data structure in an object-oriented programming environment. In general, a class is template for an object. A class defines the abstract characteristics of the object, including its characteristics (its attributes, fields or properties) and the object's behaviors (the things it can do, or methods, operations or features). Classes provide modularity and structure in an object-oriented computer program.

An embodiment of the present invention uses instances. In the following description, the term "instance" is to be understood to refer not to a generic data file that is an input to, an output of, or used by, a computer program; but instead to a specific type of data structure in an object-oriented programming environment. In general, an instance is an actual object, created at run-time, of a particular class. The set of values of the attributes of the instance is called its state. The instance includes its state and its behavior as defined in the object's class (or classes).

An embodiment of the present invention uses software components. In the following description, the term "software component" is to be understood to refer not to a generic computer program; but instead to a computer program in an object-oriented programming environment that instantiates objects. A software component may also receive (e.g., as an input) an object that was instantiated by another software component.

As discussed above, many existing systems for semantic annotation of objects assume a 1:1 mapping between class models and ontologies. Reality, however, often tells a different story.

Class models and ontologies are different by nature. An ontology claims to be a generic, commonly agreed upon specification of a conceptualization of a domain, with a focus on precisely capturing the semantics of terms used in a domain. A class model in turn is task-specific, with the focus on an efficient implementation of an application for solving tasks in the modeled domain. Thus, a software engineer would rather trade off precision for a simple, efficient model, while an ontology engineer would trade off simplicity for a precise representation. Another difference is that in software engineering, models are most often prescriptive models, which are used to specify how a system is supposed to behave, while ontologies are rather descriptive models, which describe how the world is. Furthermore, an ontology only captures the real world domain, while a class model mixes information about the real world domain and the software system.

Due to those differences, one often faces the situation where class models and ontologies are incompatible in the sense that a 1:1 mapping does not exist. Enforcing a 1:1 mapping would either result in cumbersome class models or in sub-optimal ontologies since the shared conceptualization they are supposed to reflect would be based on concepts only existing in the IT-system domain, hence hardly reflecting the conceptualization of a domain expert. Therefore, conventional annotation approaches relying on such a mapping do not work in most cases, which means that they can only be employed when either the class model is adapted to the ontology, or vice versa. As this is a desired solution only in rare cases, such incompatibilities create a large hurdle for applying semantic web technology, e.g. for application integration, in practice.

Also as discussed above, it is observed that most current approaches for annotating class models are intrusive (i.e. they require altering the class model), which is also problematic when applying those approaches to real-world settings. When integrating systems, the implementation of the components to be integrated cannot or must not be changed in many cases, e.g. if they are only available as binary code, created by a code generator which cannot be adapted, or if license agreements forbid changes to the code. Thus, intrusive implementations are often not practicable. This also holds for generative implementations, which cannot be applied when integrating existing applications.

As detailed below, an embodiment of the present invention addresses these two issues and implements an approach for semantically annotating class models. This implementation is dynamic, i.e. it does not rely on static 1:1 mappings between the class model and the ontology used for annotation, and it is non-intrusive, i.e. it can be implemented without having to change the class model to annotate. Instead of using static links between the class model and the ontology, the implementation uses rules which are dynamically evaluated at run-time for producing object annotations.

An embodiment of the present invention relates to direct models, where the classes dealt with are related to categories in the ontology rather than to constructs of an ontology language. The embodiment may relate to a Java implementation, in which case the class is a Java class. Other embodiments may involve other object-oriented programming languages.

As mentioned above, an embodiment of the present invention relates to a non-intrusive way of annotating objects. Non-intrusive approaches do not require any changes on the class model, and thus can be applied when the developer cannot or must not change the class model, be it for technical or for legal reasons. Non-intrusive approaches provide means for annotating class models without modifying those class models, e.g. by using mappings in a separate file, or by dynamically registering classes with categories in the ontology at run-time. The drawback of non-intrusive approaches is often a larger coding effort (compared to running a code generator, adding a few Java annotations [which are Java language constructs that may carry arbitrary meta data], or using semantic annotations). In general, intrusive mechanisms may be implemented by Java annotations, by adding additional variables, by adding additional methods, or by renaming classes, variables or methods according to specific naming conventions. In contrast, non-intrusive mechanisms may use run-time registration.

Overview

Figure 2:
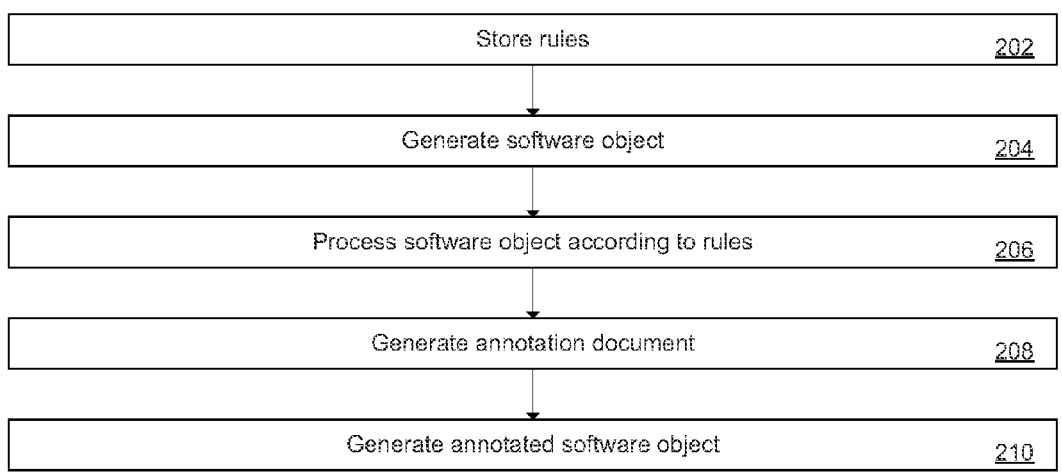
FIG. 2 is a flowchart of a method for annotating software objects in an object-oriented computing environment according to an embodiment.

First, FIGS. 1-2 are described in order to provide a general overview of an embodiment of the present invention. Then, further details and various examples are described in FIGS. 3-10.

FIG. 1 is a block diagram of a system 100 that implements annotations according to an embodiment. The system 100 may be implemented as one or more computer programs that are stored or executed by an application server (see, e.g., FIG. 10).

The system 100 includes an annotation engine component 102, a rules storage component 104, and an ontology-enabled application programming interface (API) component 106. The system 100 interfaces with a software component 108. In general, the software component 108 generates an object 110, and the system 100 generates an annotated object 112.

The annotation engine component 102, in general, generates an annotation 114 as appropriate for the object 110. The annotation engine component 102 includes a rule engine component 120, an object inspector component 122, a resource identifier factory component 124, and an annotation writer component 126. The annotation engine component 102 interfaces with the rules storage component 104. The rules storage component 104, in general, stores rules 130. The rules 130 refer to a domain ontology 132. The ontology-enabled API component 106, in general, interfaces between the software component 108 (to receive the object 110) and the annotation engine component 102 (to receive the annotation 114 and to generate the annotated object 112).

The rule engine component 120, in general, generates a set of RDF triples from the head of a particular rule when the body of the particular rule is met by the software object. Specific examples of RDF triples can be seen in FIGS. 3-9.

The object inspector component 122, in general, tests the object 110 according to a condition or reads data from it according to an expression to obtain a result. The conditions and expressions used to test the object 110 and read data from it are contained in the rules 130.

The resource identifier factory component 124, in general, creates a resource identifier for the object 110. The resource identifier is unique to, and is unambiguous for, the object 110.

The annotation writer component 126, in general, generates the annotation 114 based on the result of the expression in the rules 130 applied to the object 110.

The software component 108 includes business logic 140, object instances 142, and a component API 144. The business logic 140 controls the operation of the software component 108, for example to create and to manipulate the object instances 142. The object instances 142 are instances of objects that the software component 108 creates (or receives from other software components), including the object 110. The component API 144 interfaces between the software component and other software components, for example for the input and output of objects.

FIG. 2 is a flowchart of a method 200 for annotating software objects in an object-oriented computing environment. The method 200, in general, describes the operation of the system 100 (see FIG. 1). The method 200 may be implemented by one or more computer programs that are stored or executed by an application server (see, e.g., FIG. 10). In general, the method 200 transforms existing software objects into RDF according to an ontology.

At 202, rules are stored that define how to annotate software objects. The rules operate according to the respective classes of the software objects. For example, the rules storage component 104 (see FIG. 1) may store the rules 130.

At 204, a software object is provided. The software object is an instance of a particular class. The software object may be generated by a program executed by the application server or may be provided to the application server by another program. For example, the software component 108 (see FIG. 1) may generate the object 110.

At 206, the software object is processed according to the rules. For example, the annotation engine component 102 (see FIG. 1) may process the object 110 according to the rules 130.

At 208, an annotation document is generated based on the software object having been processed (see 206) according to the rules. For example, the annotation engine component 102 (see FIG. 1) may generate the annotation 114 based on the object 110 having been processed according to the rules 130.

At 210, an annotated software object is generated based on the software object and the annotation document. The annotated software object corresponds to the software object as annotated by the annotation document. For example, the ontology-enabled API component 106 (see FIG. 1) may generate the annotated object 112 based on the object 110 and the annotation 114.

As an initial step, the rules may be registered. For example, the annotation engine component 102 (see FIG. 1) may register the rules 130. For example, the rules engine 120 may register the rules 130 so that the rules 130 are on-hand for processing the object 110. Alternatively, the rules engine 120 may refer to the rules 130 in the rules storage 104 when processing the object 110.

The method 200 may include one or more substeps or additional steps that implement the functionality of the other components described above for the system 100 (e.g., the specific functionality of the rule engine component 120).

The embodiment of FIG. 1 or FIG. 2 can be implemented by an application server in a three tier hierarchy. In general, a three tier hierarchy includes a presentation tier, an application tier, and a database tier. Each tier may be implemented by one or more computers or servers, e.g., an application server in the application tier. The application server may implement the annotation engine 102, the software component 108, the ontology-enabled API 106, or other components. The application server can be the computer system 2410 (see FIG. 10). The rules storage 104 may be implemented by a database server in the database tier. The database server may also store the object instances 142, the annotated objects 112, or other data or data structures. The database server can be the server 2431 (see FIG. 10). The presentation tier may implement a user interface for the user to interact with the system 100, e.g. to create or edit the rules 130, to interact with the object 110, or to interact with the annotated object 112. The presentation tier may be implemented by the client 2415 (see FIG. 10).

Further details regarding the features and operation of an embodiment of the present invention are provided below in the sections "Further Details", "Examples" and "Details Regarding Dynamic Semantic Annotation".

Further Details

As discussed above, the system 100 implements dynamic semantic annotation in a non-intrusive manner. For example, the software component 108 may be regarded as a black box that accepts certain inputs and that generates certain outputs, but without any further requirements or knowledge concerning its details or detailed operation. In summary, the system 100 operates as follows. As a preparing step, the rules 130 are registered at the annotation engine component 102. When an object 100 is retrieved from the component's API 144, it is sent to the annotation engine 102, which returns the annotation 114 for the object 110. The ontology-enabled API 106 provides the annotated object 112 for information exchange.

More specifically, at run-time, objects are instantiated in each component. For example, consider the objects instantiated as the instantiated objects 142 by the component 108. When the object 110 "leaves" the component 108 via the API 144 (e.g. when a message containing an object is sent out by the component 108, or when a user queries the component 108 for a set of its objects), the object 100 is to be annotated, so it can be processed e.g. by a reasoner or by another component. Therefore, the annotation engine component 102 "hides" the original API 144 behind the ontology-enabled API 106 (also referred to as a façade), which forwards the object 110 from the component 108, augmented with the annotation 114, as the annotated object 112. To this end, it passes the object 110 to the annotation engine component 102, which returns the annotation 114 in the form of an RDF document that describes the object 110 according to the common domain ontology 132. This RDF document is then attached to the object 110, so the object is semantically annotated as the annotated object 112.

For each component 108, a set of annotation rules 130 is stored. The rules 130 define how to create the annotation 114 for objects of a certain class. The categories and relations referred to in those rules are defined in the common domain ontology 132, which is used for annotation.

As described in FIG. 1, the annotation engine 102 includes four integral parts: the rule engine component 120 that processes the annotation rules 130, the object inspector component 122 that performs tests on the object to be annotated, the resource identifier factory component 124 that creates unique and unambiguous URIs for objects, and the annotation writer component 126 that creates the annotation document 114 for the object 110 based on the outcome of evaluation the rules.

The rule engine component 120 evaluates the bodies of the rules 130, e.g. XPath expressions according to an embodiment. To that end, it makes use of the object inspector component 122, which can perform tests on the object 110 to get the results of such an XPath expression. An embodiment of the rule engine component 120 may use JXPath, which directly process XPath expressions on Java objects using Java's reflection API. If a rule's body is fulfilled, the corresponding triples from the head are generated, which in most cases requires more calls to the object inspector component 122 for filling in the variable parts.

Each rule evaluation returns a set of triples. Those sets may be unified (which may involve the renaming of blank nodes, as discussed below) to an RDF document, which is then returned to the ontology-enabled API 106. This step is performed by the annotation writer component 126.

As a result, each component 108 is encapsulated by the ontology-enabled API 106 with which annotated objects 112 can be obtained from all integrated components. This ontology-enabled API 106 can be used for various purposes, such as establishing a message exchange between components using annotated objects, or building a SPARQL (SPARQL Protocol and RDF Query Language) endpoint for reasoning on objects contained in the various components. It thus performs a useful function for system integration.

An embodiment of the present invention may have one or more of the following features. First, the software component 108 may generate the object 110 such that the object 110 lacks annotation; thus the system 100 adds the annotation 114 to generate the annotated object 112. Alternatively, the software component 108 may generate the object 110 such that the object 110 has an interim annotation, in which case the system 100 replaces the interim annotation with the annotation 114, or adds it as an additional annotation to the interim annotation. The whole system 100 may also be regarded as an embodiment of the software component 108, thus, several layers of annotations may be stacked.

Second, the annotation engine component 102 may process the object 110 in a non-intrusive manner with regard to the software component 108. Thus, the annotation engine component 102 may operate with legacy software components that cannot be modified (technically or legally), or that would be difficult to modify, in order for the software component to generate annotated objects on its own.

Third, the system 100 may implement the rules 130 such that they relate an ontology and a class model in a manner other than a 1:1 mapping. This relationship may also be called an arbitrary mapping.

Fourth, the rules define how to create the annotation document, and the rules may include categories and relations as specified in the ontology. The categories and the relations relate to the domain ontology 132.

Fifth, the annotation engine component 102 may generate the annotation document 114 in a dynamic manner. This operation may be contrasted with many existing systems that use a static 1:1 mapping.

EXAMPLES

Figure 7:
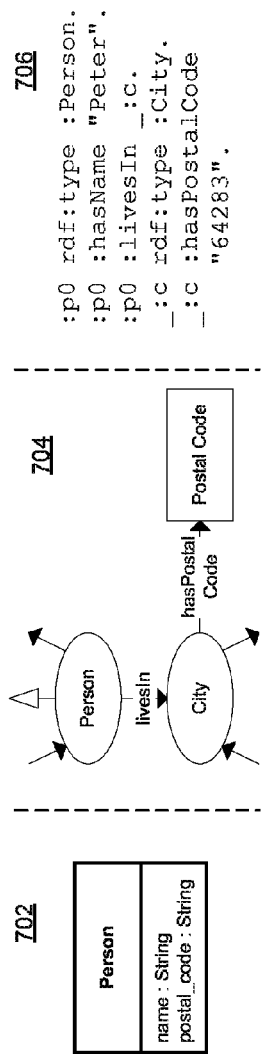
Figure 8:
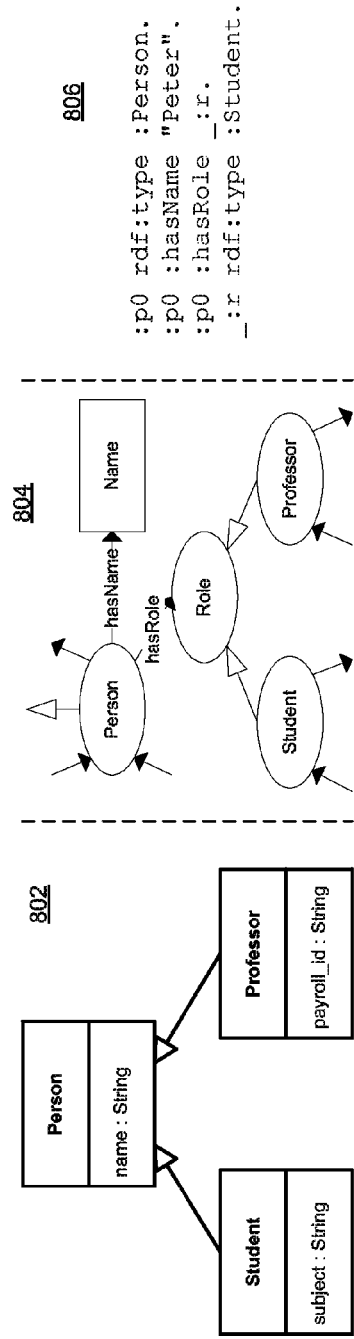
Figure 9:
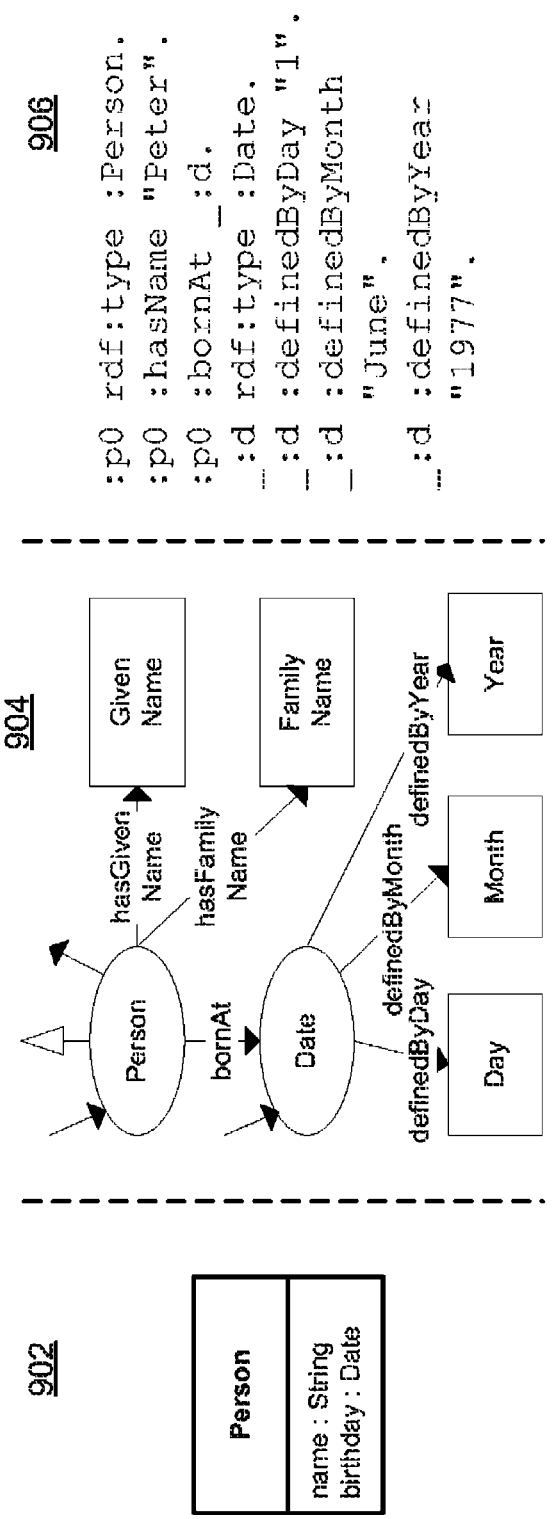

FIGS. 3-9 illustrate various examples in which an embodiment of the present invention is useful, in contrast to many existing solutions that would be unsuitable when presented with the examples. In general, one problem with static semantic annotation approaches is that they assume a 1:1 mapping between a class model and the ontology used for annotating that model. However, many real-world problems suffer from the non-existence of such a mapping. The following examples illustrate such mismatches. FIGS. 3-6 illustrate multi-purpose and artificial classes and properties; FIGS. 7-8 illustrate simplified chains of relations; and FIG. 9 illustrates non-atomic data types.

Classes in a programming model may be used for representing information about different things. Consider FIG. 3, which shows an excerpt from a class model 302, an excerpt from an ontology 304, and a set of exemplary desired RDF triples 306 to be used for annotation. The class model 302 shows the name of the class in its upper part and the attributes of the class in its lower part, using the UML notation. The ontology 304 shows categories as ellipses, data attributes as rectangles, subcategory relations as arrows with empty heads, and other relations as arrows with filled heads. Each of the RDF triples 306 is an expression in the form of subject-predicate-object in which the subject denotes the resource, and the predicate denotes traits or aspects of the resource and expresses a relationship between the subject and the object. For example, the RDF triples 306 convey the following information in English: p0 is a man who has the name "Peter".

Figure 3:
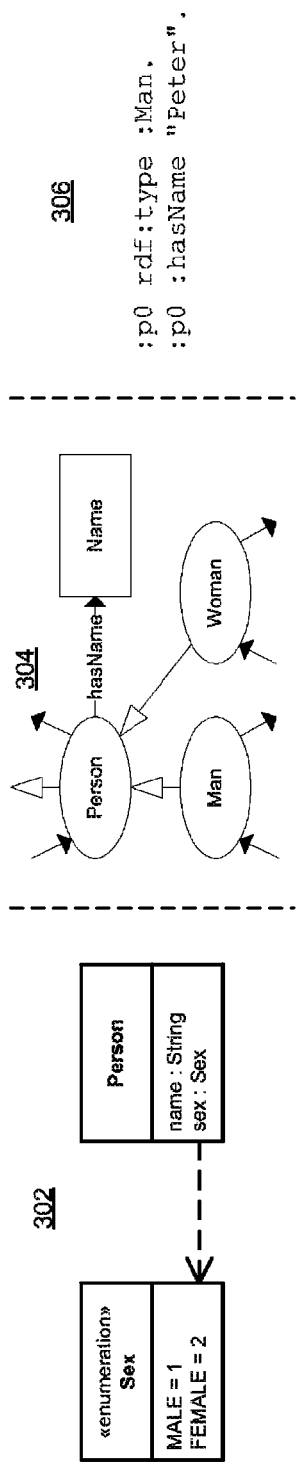

In FIG. 3, one class "Person" is used for representing instances of both categories "Man" and "Woman", distinguished by an attribute. (Actual category membership may be decided based on a flag.) Although this class can be mapped to the "Person" category in the ontology 304, information is lost this way. A static mapping approach cannot evaluate the sex attribute at run time and decide upon its value which annotation to produce, since the mapping is statically defined at design time. In contrast, an embodiment of the present invention is capable of generating a mapping that addresses this example.

For example, one of the rules 130 could state that for each object 110 of type Person whose sex attribute has the value "MALE", a triple "identifier(110) rdf:type :Man" should be produced. As the rule engine 120 processes that rule, the object inspector 122 reads the value of the object's sex attribute, and if the condition equates to true, the corresponding triple is generated, using the resource identifier factory component 124 for obtaining a unique identifier for the object. The resulting triple is passed to the annotation writer component 126 to be added to the object's annotation. When all rules 130 have been processed, the annotation writer unifies their results to an annotation 114 and passes it to the ontology-enabled API 106, which produces the annotated object 112 from the object 110 and the annotation 114. (This process is described in more detail below the remainder of the examples.)

Figure 4:
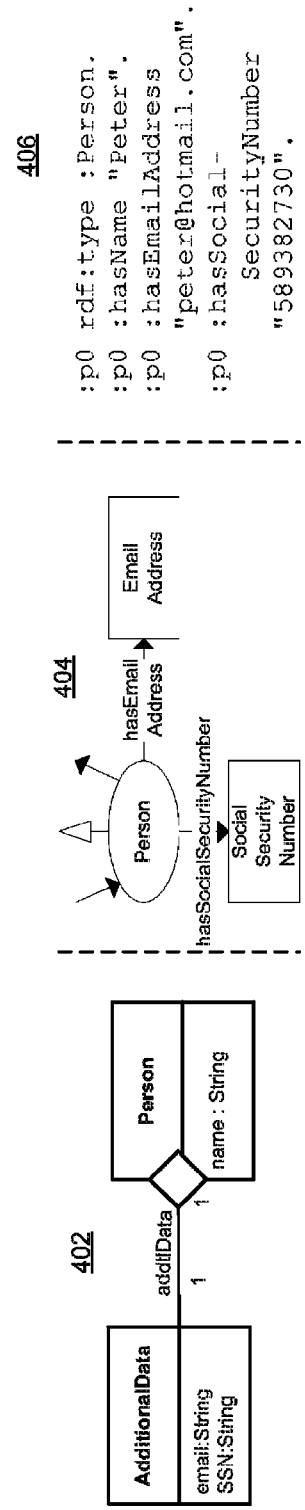

A special case of multi-purpose classes are artificial classes: The class model may also contain classes that do not have any corresponding category in the shared conceptualization, and therefore not in the ontology either. One example is shown in FIG. 4, in which an "AdditionalData" class is used for storing information both about a person's email address and social security number. (Similar to FIG. 3, FIG. 4 shows an excerpt from a class model 402, an excerpt from an ontology 404, and a set of exemplary desired RDF triples 406 to be used for annotation.) While such a class may be useful for the developer, rigid ontology engineering would avoid categories such as "AdditionalData". Thus, objects of that class must be annotated with different ontological categories. A static mapping approach cannot process this example; in contrast, an embodiment of the present invention is capable of generating a mapping that addresses this example.

Similarly to using one class for several ontological categories, one relation or attribute in the class model may have different corresponding relations in the ontology. FIG. 5 shows an excerpt from a class model 502, an excerpt from an ontology 504, and a set of exemplary desired RDF triples 506 to be used for annotation. In the example shown in FIG. 5, an additional flag attribute is used to determine whether the value of the "contactData" attribute denotes a phone number, a fax number, or an email address. In the class model 502, only one type of contact information is stored per person. Note that the enumeration "ContactType" does not have any corresponding category in the ontology 504. A static mapping approach cannot process this example; in contrast, an embodiment of the present invention is capable of generating a mapping that addresses this example.

In worse cases, there might even be no flag attributes determining the actual representation, but only background knowledge held by the developer who uses the class model, as shown in FIG. 6. (Similar to FIG. 5, FIG. 6 shows an excerpt from a class model 602, an excerpt from an ontology 604, and a set of exemplary desired RDF triples 606 to be used for annotation.) In this example, the same attribute "contactData" is used to hold information about the phone number and email address, and the program logic distinguishes both cases based on whether the attribute value contains an @ symbol. A static mapping approach cannot process this example; in contrast, an embodiment of the present invention is capable of generating a mapping that addresses this example.

For reasons of simplicity, shortcuts are often used in a class model. Such shortcuts may skip some categories when traversing a chain of object relations and move attributes to other categories than in a precise ontology. FIG. 7 shows an excerpt from a class model 702, an excerpt from an ontology 704, and a set of exemplary desired RDF triples 706 to be used for annotation. FIG. 7 shows that the "Person" class in 702 stores a "postal_code" attribute containing the postal code of the city the person lives in, but there is no direct relation in the ontology 704, since in a precise formalization, persons do not have postal codes by nature—in the ontology 704, "Person" and "Postal Code" are interconnected via the "City" concept, which is omitted in the class model 702 by using a shortcut. Thus, the attribute cannot be directly mapped to one relation in the ontology, but rather to a chain of relations. A static mapping approach cannot process this example; in contrast, an embodiment of the present invention is capable of generating a mapping that addresses this example.

As shown in FIG. 8, such shortcuts may also comprise combined chains of object and inheritance relations. In this example, the classes "Professor" and "Student" are modeled as subclasses of "Person" in the class model 802, while in the ontology 804, they are modeled as roles a person can have—a typical difference between ontological and object-oriented modeling. In that case, the person and her role become mixed in the class model 802, i.e. attributes assigned to the "Role" concept in the ontology become attributes of the person. The RDF triples 806 result. A static mapping approach cannot process this example; in contrast, an embodiment of the present invention is capable of generating a mapping that addresses this example.

Data attributes may often contain non-atomic values, such as a name attribute storing both first and last name (or even worse from an ontologically precise point of view: also an academic degree), dates (consisting of a day, a month, and a year), and so on. Phone numbers are also non-atomic, as they consist of a country and an area code, a number, and an extension. FIG. 9 illustrates the issues related to non-atomic values. FIG. 9 shows an excerpt from a class model 902, an excerpt from an ontology 904, and a set of exemplary desired RDF triples 904 to be used for annotation. Note that from the values contained in the non-atomic data types of the class model, several RDF triples 906 have to be generated. A static mapping approach cannot process the date case in this example; in contrast, an embodiment of the present invention is capable of generating a mapping that addresses the date case in this example. More specifically, various rules may be created for parsing various date formats into the correct values for day, month and year.

Details Regarding Dynamic Semantic Annotation

As the examples above illustrate, a static approach relying on a 1:1 mapping from classes and attributes to ontology concepts does not fit. In contrast, an embodiment of the present invention uses dynamic semantic annotation to transfer objects from an arbitrary class model into instance data of a given ontology.

In contrast to a static approach that defines the semantic annotation of an object at the class level at design time (e.g., saying that each object of a class C gets the same annotation, or that each object instance carries the same meaning), an embodiment performs a dynamic annotation that is able to inspect the object at runtime and to produce an annotation based on that inspection. An embodiment uses rules for defining which object should get which annotation. Furthermore, the triples generated as a semantic annotation may have dependent values, which can also be calculated, e.g. by using regular or arithmetic expressions.

According to an embodiment, the rules have a body and a head in the following format. The body consists of a test to be performed on an object. The head is a set of RDF triples, each consisting of a subject, a predicate, and an object; all three of which may depend on the object to annotate. For expressing tests and dependent values, an embodiment uses XPath, which may be not only be used to query XML documents, but also Java objects. If the test is evaluated positively, one or more triples are generated, consisting of a subject, predicate, and object. The subject, predicate, and object may be either constants or XPath expressions as well. Thus, the syntax of the rules looks as follows (using the extended Backus-Naur form):

Rule::=XPathExpr"→"Triple{";"Triple}"."; (1)

Triple::=3*(Constant|XPathExpr); (2)

In this syntax, "Constant" denotes an arbitrary sequence of characters enclosed in quotation marks, and "XPathExpr" denotes an XPath expression following the XPath standard, enhanced by the following three extensions. First, the function "uri( )" assigns a unique URI to a Java object. Second, the function "regex(String)", called on a Java attribute, evaluates a regular expression on that object and yields true if the regular expression matches the attribute value, false otherwise. Third, the % symbol used in the head refers to the result of the XPath test performed in the body.

An example rule creating part of a semantic annotation for a "Person" object with an "address" attribute may look as follows:

/address→/uri( )"<#hasAddress>"%/uri( ). (3)

For a person object "p" with the unique URI "hxxp://foo.bar#p0", the rule would be evaluated by retrieving the value of "p.address" (in Java, this typically means calling a getter function). Assuming the result is an address object with the URI "hxxp://foo.bar#a0", the body is evaluated for generating the corresponding triple, which results in calling the "uri( )" function on the object "p", producing the constant "<#hasAddress>", and calling the "uri( )" function on the address object identified with the XPath expression of the rule's body (which is referenced by using the % symbol). Thus, the following triple is generated as an annotation (given "hxxp://foo.bar" is the default namespace):

<#p0><#hasAddress><#a0>.

Testing attribute values identified by an XPath expression allows for generating triples only if a certain condition is fulfilled. This helps solving the problem of multi-purpose classes:

/[sex="MALE"]→/uri( )"<rdf:type>"<#Man>. (4)

According to the XPath syntax, terms in brackets define tests. The corresponding element is only selected in case that the test is evaluated to true. Rule 4 thus only fires if the value of the attribute sex has the value "MALE".

Multi-purpose relations can be handled the same way. If implicit knowledge is involved, e.g. for telling an email address from a phone number, as shown in FIG. 6, additional tests with regular expressions may be used to make that knowledge explicit:

/address[regex(^.*@.*$)]→/uri( )"<rdf:hasEmailAddress>"%. (5)

/address[regex(^[^@]*$)]→/uri( )"<rdf:hasPhoneNumber>"%. (6)

Rule 5 fires if the value of the inspected object's address attribute contains an @ symbol, and then produces the corresponding annotation. Rule 6 fires in the opposite case.

Artificial classes, as shown in FIG. 4, can also be handled by adding additional triples to the semantic annotation:

/addtlData/email→/uri( )"<#hasEmailAddress>"%. (7)

/addtlData/SSN→/uri( )"<#hasSocialSecurityNumber>"%. (8)

Like in the examples above, the rules' bodies are fulfilled if the respective attribute of the artificial class exists. If, e.g., the "AdditionalData" object has the "email" attribute set, a respective triple is added to the "Person" object's semantic annotation.

Shortcuts, as shown in FIG. 7 and FIG. 8, may be handled by inserting blank nodes (indicated by an underscore):

/postal_code→/uri( )"<#livesIn>"_:city, _:city "<#hasPostalCode>"%. (9)

When the head of rule 9 is evaluated, two statements are generated, which are interconnected via one blank node "_:city", denoting a city that is known to exist, but not further specified. When the results of multiple rule heads are merged, each rule's result is treated like a separate RDF document; thus, the blank nodes' IDs are renamed to remain unique throughout the merged annotation. Accordingly, the developer of annotation rules has to assure unique names for blank nodes only within one rule, but not across different rules.

Dealing with non-atomic data types, as shown in FIG. 9, is a more difficult task. In cases where the background knowledge may be formalized, e.g. separating a street name from a house number, regular expressions can be used for implementing dynamic annotation. However, there are numerous cases which cannot be formalized that easily. One typical case is splitting a name into a first name and a last name—even with massive domain knowledge, it is practically impossible to formulate a rule which treats all names in every language correctly. This case demonstrates the limitations of automatically annotating objects. Note that this limitation is not a limitation of an embodiment of the present invention, but a limitation that is due to the fact that some kind of background knowledge can hardly be completely formalized.

FIG. 10 is a block diagram of an example computer system and network 2400 for implementing embodiments of the present invention. Computer system 2410 includes a bus 2405 or other communication mechanism for communicating information, and a processor 2401 coupled with bus 2405 for processing information. Computer system 2410 also includes a memory 2402 coupled to bus 2405 for storing information and instructions to be executed by processor 2401, including information and instructions for performing the techniques described above. This memory may also be used for storing temporary variables or other intermediate information during execution of instructions to be executed by processor 2401. Possible implementations of this memory may be, but are not limited to, random access memory (RAM), read only memory (ROM), or both. A storage device 2403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 2403 may include source code, binary code, or software files for performing the techniques or embodying the constructs above, for example.

Computer system 2410 may be coupled via bus 2405 to a display 2412, such as a cathode ray tube (CRT) or liquid crystal display (LCD), for displaying information to a computer user. An input device 2411 such as a keyboard and/or mouse is coupled to bus 2405 for communicating information and command selections from the user to processor 2401. The combination of these components allows the user to communicate with the system. In some systems, bus 2405 may be divided into multiple specialized buses.

Computer system 2410 also includes a network interface 2404 coupled with bus 2405. Network interface 2404 may provide two-way data communication between computer system 2410 and the local network 2420. The network interface 2404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 2404 sends and receives electrical, electromagnetic, or optical signals that carry digital data streams representing various types of information.

Computer system 2410 can send and receive information, including messages or other interface actions, through the network interface 2404 to an Intranet or the Internet 2430. In the Internet example, software components or services may reside on multiple different computer systems 2410 or servers 2431, 2432, 2433, 2434 and 2435 across the network. A server 2431 may transmit actions or messages from one component, through Internet 2430, local network 2420, and network interface 2404 to a component on computer system 2410.

The computer system and network 2400 may be configured in a client server manner. For example, the computer system 2410 may implement a server. The client 2415 may include components similar to those of the computer system 2410.

More specifically, the client 2415 may implement a client-side interface for displaying information generated by the server, for example via HTML or HTTP data exchanges. The computer system 2410 may implement the system 100 as part of implementing an application server, for example by executing one or more computer programs. For example, the storage device 2403 may implement the rules storage 104. The processor 2401 may implement the functionality of the annotation engine component 102 or the method 200. The client 2415 may implement a graphical user interface for interacting with the system 100. Further note that the software component 108 and the annotation engine component 102 may be implemented by different servers, e.g., the server 2410 may implement the software component 108 and the server 2431 may implement the annotation engine component 102.

CONCLUSION

Ontologies may be used for information system integration. To that end, the integrated systems need to exchange information, e.g. in the form of semantically annotated data objects. Current approaches for annotating data objects are often static, i.e. they assume a 1:1 mapping between the class model and the ontology used for annotation, and intrusive, i.e. they require changes to the class model. Both assumptions are often not met by real world integration scenarios. Due to the fact that class models and ontologies serve different purposes, a 1:1 mapping most often does not exist—otherwise, the ontology would be rather weak, or the class model would be too complex. Furthermore, class models often cannot or must not be changed, be it for technical or for legal reasons. Thus, a more sophisticated mechanism for annotating objects is required.

A number of typical mismatches between class models and ontologies have been discussed above. To cope with such mismatches, an embodiment implements dynamic semantic annotation, which, instead of hard-wiring classes from a class model to ontological categories, uses rules and run-time inspection of objects to create annotations for objects. An embodiment implements such a dynamic annotation approach in a non-intrusive way, i.e. without changing the original class model.

Reasoners operating on the objects of a software component may use such RDF annotations, e.g. by regarding them as an triple store, and answer queries about the objects inside the software component. An embodiment may be integrated with other systems, such as that described in Heiko Paulheim, "Efficient Semantic Event Processing: Lessons Learned in User Interface Integration", Volume 6089 of LNCS at 60-74 (Springer 2010) (describing an architecture for application integration, which pulls instance data dynamically into a reasoner's A-box for efficient reasoning, using so-called A-box connectors). An embodiment may be integrated with such a system by wiring the reasoner's A-box connectors to the component's annotation engine. This allows for reasoning on a component's objects based on an ontology, even if that ontology is not reflected in the design of the software component's class model.

In sum, an embodiment implements the automatic generation of RDF annotations from Java objects and uses these annotations for message exchange between components.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of annotating software objects, comprising:
  providing a software object, wherein the software object is an instance of a class in an object-oriented computing environment, and wherein the software object is generated by a software component executed by an application server;
  determining a plurality of rules based on the class, wherein the plurality of rules define how to annotate the software object;
  processing, by an annotation engine component executed by the application server, the software object according to the plurality of rules;
  generating, by the annotation engine component, an annotation document based on the software object having been processed according to the plurality of rules; and
  generating, by an application programming interface component executed by the application server, an annotated software object based on the software object and the annotation document, wherein the annotated software object corresponds to the software object as annotated by the annotation document;
  wherein the annotation engine component is configured to process the software object in a non-intrusive manner with regard to the software component such that the software component is not modified; and wherein the plurality of rules define how to create the annotation document, wherein the plurality of rules includes a plurality of categories and a plurality of relations, and wherein the plurality of categories and the plurality of relations relate to a domain ontology.

2. The method of claim 1, wherein the software component is configured to generate the software object such that the software object lacks annotation.

3. The method of claim 1, wherein the plurality of rules relate an ontology and a class model according to an arbitrary mapping.

4. The method of claim 1, further comprising:
registering, by the annotation engine component, the plurality of rules.

5. The method of claim 1, wherein the annotation engine component is configured to generate the annotation document in a dynamic manner.

6. The method of claim 1, wherein the plurality of rules includes a particular rule that has a head and a body, further comprising:
generating, by a rule engine component of the annotation engine component, a set of resource description framework (RDF) triples from the head of the particular rule when the body of the particular rule is met by the software object.

7. The method of claim 1, wherein the plurality of rules includes an expression, further comprising:
testing and reading data from, by an object inspector component of the annotation engine component, the software object according to the expression to obtain a result.

8. The method of claim 1, further comprising:
creating, by a resource identifier factory component of the annotation engine component, a resource identifier for the software object, wherein the resource identifier is unique to the software object, and wherein the resource identifier is unambiguous for the software object.

9. The method of claim 1, further comprising:
generating, by an annotation writer component of the annotation engine component, the annotation document based on a result of an expression in the plurality of rules applied to the software object.

10. The method of claim 1, wherein the plurality of rules comprise a plurality of conditions and expressions used to test the software object.

11. A non-transitory computer readable medium storing instructions, that when executed by the a computer processor configure the computer processor for:
determining a software object, wherein the software object is an instance of a class in an object-oriented computing environment,
determining a plurality of rules based on the class, wherein the plurality of rules define how to annotate a software object;
processing the software object according to the plurality of rules;
generating an annotation document based on the software object having been processed according to the plurality of rules; and
generating an annotated software object based on the software object and the annotation document, wherein the annotated software object corresponds to the software object as annotated by the annotation document;
wherein the annotation engine component is configured to process the software object in a non-intrusive manner with regard to the software component such that the software component is not modified; and
wherein the plurality of rules define how to create the annotation document, wherein the plurality of rules includes a plurality of categories and a plurality of relations, and wherein the plurality of categories and the plurality of relations relate to a domain ontology.

12. A system for controlling a computer system to annotate software objects, comprising:
a server computer that is configured to connect to a client computer via a network, wherein the server computer is configured to determine a software object, wherein the software object is an instance of a class in an object-oriented computing environment;
wherein the server computer is configured to determine a plurality of rules based on the class, wherein the plurality of rules define how to annotate a software object,
wherein the server computer is configured to process the software object according to the plurality of rules,
wherein the server computer is configured to generate an annotation document based on the software object having been processed according to the plurality of rules, and
wherein the server computer is configured to generate an annotated software object based on the software object and the annotation document, wherein the annotated software object corresponds to the software object as annotated by the annotation document;
wherein the server computer is configured to process the software object in a non-intrusive manner with regard to the software component such that the software component is not modified; and
wherein the plurality of rules define how to create the annotation document, wherein the plurality of rules includes a plurality of categories and a plurality of relations, and wherein the plurality of categories and the plurality of relations relate to a domain ontology.

13. The system of claim 12, wherein the server computer is configured to generate the software object.

14. The system of claim 12, wherein the server computer is configured to execute a storage component, an annotation engine component, and an application programming interface component,
wherein the storage component is configured to store the plurality of rules,
wherein the annotation engine component is configured to process the software object according to the plurality of rules, and to generate an annotation document based on the software object having been processed according to the plurality of rules, and
wherein the application programming interface component is configured to generate the annotated software object based on the software object and the annotation document.

* * * * *